United States Patent
Cowdry

(10) Patent No.: US 9,893,585 B2
(45) Date of Patent: Feb. 13, 2018

(54) MOTOR MOUNT

(71) Applicant: Dyson Technology Limited, Wiltshire (GB)

(72) Inventor: Guy Francis Charles Cowdry, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 13/956,041

(22) Filed: Jul. 31, 2013

(65) Prior Publication Data

US 2014/0035413 A1 Feb. 6, 2014

(30) Foreign Application Priority Data

Aug. 1, 2012 (GB) .................................. 1213697.4

(51) Int. Cl.
| | | |
|---|---|---|
| *H02K 5/24* | (2006.01) | |
| *H02K 5/00* | (2006.01) | |
| *F16F 15/00* | (2006.01) | |
| *F16F 15/02* | (2006.01) | |
| *H02K 7/14* | (2006.01) | |

(52) U.S. Cl.
CPC ............. *H02K 5/00* (2013.01); *F16F 15/00* (2013.01); *F16F 15/02* (2013.01); *H02K 5/24* (2013.01); *H02K 7/145* (2013.01)

(58) Field of Classification Search
CPC .. H02K 5/24; H02K 5/04; H02K 5/00; H02K 7/145; F16F 15/00; F16F 15/02; F16F 15/10; F16F 7/00; F16F 9/00
USPC ................................ 310/51, 89, 91; 248/638
See application file for complete search history.

(56) References Cited

U.S. PATENT DOCUMENTS

| | | | | |
|---|---|---|---|---|
| 4,602,176 A | * | 7/1986 | Baker | ............................ 310/51 |
| 5,165,867 A | * | 11/1992 | Dockery | .............. F02M 37/103 |
| | | | | 417/360 |
| 6,011,336 A | * | 1/2000 | Mathis et al. | .................. 310/91 |
| 6,021,993 A | | 2/2000 | Kirkwood | |
| 6,045,112 A | | 4/2000 | Kirkwood | |
| 6,897,580 B2 | * | 5/2005 | White | ............................ 310/51 |
| 2006/0208606 A1 | * | 9/2006 | Hirzel | .................... H02K 21/24 |
| | | | | 310/268 |
| 2007/0080593 A1 | | 4/2007 | O'Donnell | |
| 2014/0097323 A1 | | 4/2014 | Lamb | |

FOREIGN PATENT DOCUMENTS

| | | |
|---|---|---|
| DE | 1 125 603 | 3/1962 |
| DE | 196 20 960 | 8/1997 |
| DE | 20 2006 012 489 | 1/2008 |
| EP | 0272851 | 6/1988 |

(Continued)

OTHER PUBLICATIONS

Electrolux, AB, Suspension Device for a rotary device, Mar. 10, 1961, FR1255721.*

(Continued)

*Primary Examiner* — Bernard Rojas
*Assistant Examiner* — Alexander Singh
(74) *Attorney, Agent, or Firm* — Morrison & Foerster LLP

(57) ABSTRACT

A mount for an electric motor, the mount comprising a sleeve for receiving a motor, the sleeve including plurality of elements projecting from a surface of the sleeve, wherein the plurality of elements include a vertex.

8 Claims, 2 Drawing Sheets

(56) References Cited

FOREIGN PATENT DOCUMENTS

| | | | | |
|---|---|---|---|---|
| EP | 0 558 110 | 9/1993 | | |
| EP | 2 466 147 | 6/2012 | | |
| EP | 2 510 861 | 10/2012 | | |
| FR | 1255721 | * 3/1961 | ............... | H02K 5/24 |
| GB | 953057 | 3/1964 | | |
| GB | 2295056 | 5/1996 | | |
| JP | 51-69711 | 6/1976 | | |
| JP | 54-84507 | 6/1979 | | |
| JP | 54-95813 | 7/1979 | | |
| JP | 56-7462 | 1/1981 | | |
| JP | 63-39439 | 2/1988 | | |
| JP | 6-82451 | 11/1994 | | |
| JP | U-H06-82451 | * 11/1994 | ............... | F16F 15/08 |
| JP | 9-203192 | 8/1997 | | |
| JP | 2004-113944 | 4/2004 | | |
| JP | 2010-166998 | 8/2010 | | |
| NL | 250950 | 2/1964 | | |
| WO | WO-00/48293 | 8/2000 | | |
| WO | WO-03/058795 | 7/2003 | | |
| WO | WO-2011/009784 | 1/2011 | | |

OTHER PUBLICATIONS

Nagata, Takeshi, Vibration Isolation Pad, Nov. 25, 1994; JP-U-H06-82451.*

Search Report dated Oct. 30, 2013, directed to EP Application No. 13 17 6403; 6 pages.

Search Report dated Sep. 28, 2012, directed to GB Application No. 1213697.4; 1 page.

* cited by examiner

MOTOR MOUNT

REFERENCE TO RELATED APPLICATIONS

This application claims the priority of United Kingdom Application No. 1213697.4, filed Aug. 1, 2012, the entire contents of which are incorporated herein by reference.

FIELD OF THE INVENTION

The invention relates to a mount for a motor, preferably an electric motor.

BACKGROUND OF THE INVENTION

Electric motors are becoming increasingly sophisticated and modern designs are capable of ever higher rotational speeds. One such design of electric motor is a brushless DC motor as used by the applicant in its range of handheld vacuum cleaners and which is capable of being driven at rotational speeds in the region of 100000 rpm.

The use of high speed motors in fluid-moving applications such as vacuum cleaners is technically attractive since a fan unit equipped with a physically small motor can nonetheless produce very high fluid flow rates.

However, all motors produce vibration as they spin and in such high speed motors it is a particular technical challenge to reduce the noise that is generated by the motor and, therefore, transmitted to its immediate environment. This is particularly the case with brushless DC motors which tend to generate high frequency tones by virtue of the phase excitation necessary in such a motor.

It is against this background that the invention has been devised.

SUMMARY OF THE INVENTION

The invention provides a mount for an electric motor, the mount comprising a sleeve for receiving a motor, wherein the sleeve includes plurality of elements projecting from a surface of the sleeve, each of the plurality of elements including a vertex.

Each of the elements therefore defines a single point of contact with a surrounding conduit or housing within which the motor is installed, in use. The point-contact engagement or interface the motor mount makes with an installation results in a significant reduction in the acoustic energy that is transmitted from the motor through the motor mount.

The elements may take different forms, the important factor being the sharp vertex, point, or tip, the element defines in order to engage a surrounding housing. For example, the elements or 'studs' are preferably conical since conical studs are in practice more straightforward to manufacture accurately. However, the studs could be pyramidal, prismatic or bi-conic for instance.

In the context of conical studs, it is currently preferred that the studs are right circular cones such that the axis of the cone passes through the apex/vertex and the centre of the circular base of the cone at right angles. However, the base of the cone may be a shape other than a circle, polygonal for example, and the axis need not pass through the centre of the base, or through the base at right angles.

The size of the studs is a compromise since too narrow a cone may result in buckling, and too broad a cone may result in the vertex being depressed into the body of the cone when it is under load. Therefore, it is currently envisaged that the vertex angle of the studs may be in the range of 40 and 80 degrees, although it is preferred that the vertex angle is about 60 degrees. However, depending on the technical application in which the motor mount is to be used, a wide range of vertex angles may be useful, in the range of 20 to 170 degrees.

It is believed that the most benefit is to be obtained from configuring the sleeve so that the elements/studs project only from the outer surface of the sleeve, whilst the inner surface is smooth so as to contact uniformly with the underlying casing of a motor within the sleeve. However, the invention does not exclude features such as mounting lugs, or even point studs being formed either solely on the inner surface of the sleeve, or even in combination with studs on the outer surface of the sleeve.

Beneficial results are achieved when the motor mount is formed from a polymeric material, and the currently preferred material is polyurethane rubber having a hardness of 40 Shore A. However, it is believed that other polymeric materials would also achieve noise reduction benefits and particularly with hardness characteristics between 30 and 60 Shore A.

BRIEF DESCRIPTION OF THE DRAWINGS

In order that the invention may be more readily understood, embodiments will now be described by way of example only with reference to the accompanying drawings, in which.

DETAILED DESCRIPTION OF THE INVENTION

Figure 1:
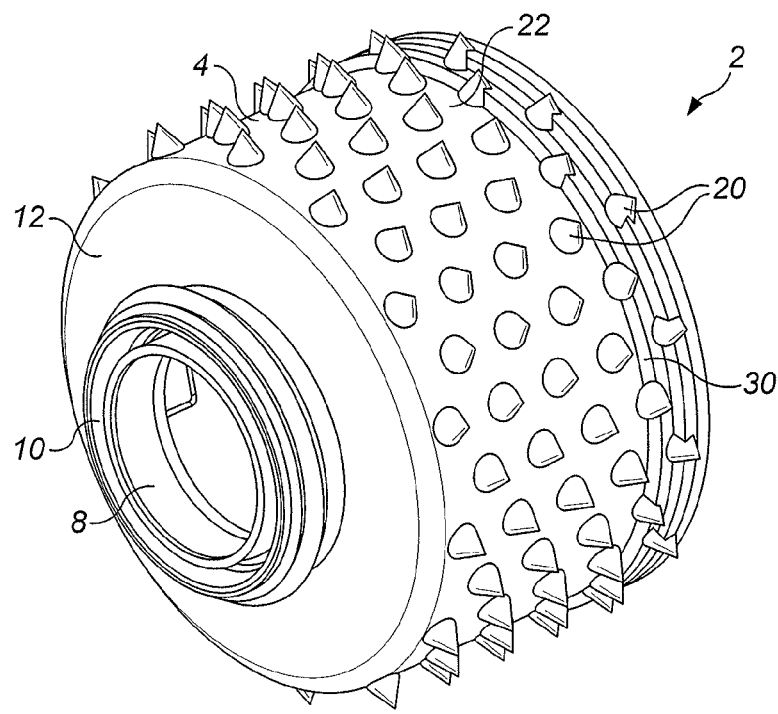
FIG. 1 is a perspective view of a motor mount in accordance with an embodiment of the invention.

With reference to FIGS. 1 to 4, a motor mount 2 comprises a generally cylindrical sleeve 4 including first and second open ends 6, 8. The first open end 6 is shown to the right of the figures, and the diameter of the first open end 6 is substantially the same as the diameter of the sleeve 4. The second open end 8 is shown to the left of the figures. The second open end 8 is formed by a central boss 10 that projects from a flange 12 extending inwardly from the cylindrical wall of the sleeve 4. The second open end 8 has a smaller diameter than the first open end 6 and, in this embodiment, is about half the size of the first open end 6.

Figure 2:
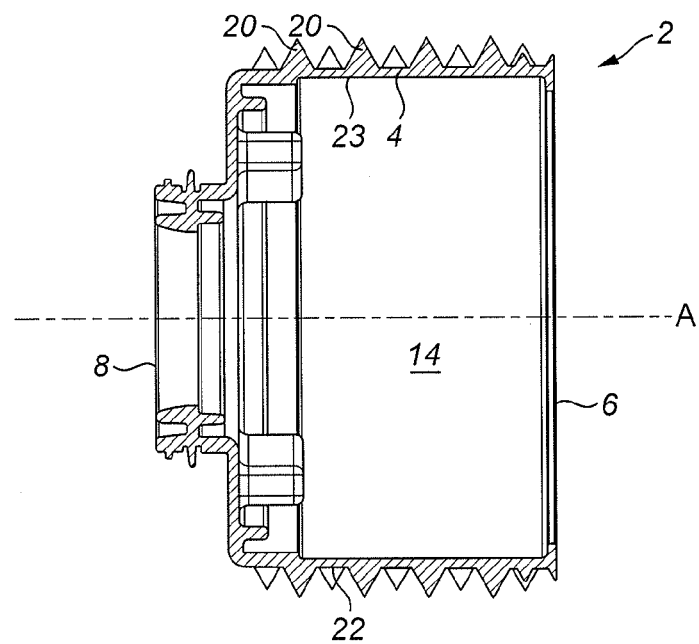
FIG. 2 is a cross section view through a longitudinal plane of the motor mount in FIG. 1.

The configuration of the sleeve 4 defines a chamber 14, as shown in FIG. 2, into which is received an electric motor 16. The motor 16 is received within the chamber 14 through the first, relatively wide, open end 6 of the sleeve 4. Preferably the sleeve 4 is a flexible material such as a polymer so that the sleeve 4 can be pulled over the external surface of the motor 16, and stretched if necessary, so that an inner surface 23 of the sleeve 4 forms a tight fit around the motor 16, like a sock. Note that the inner surface 23 is smooth in this embodiment so as to conform closely to the cylindrical outer profile of the motor 16.

Figure 4:
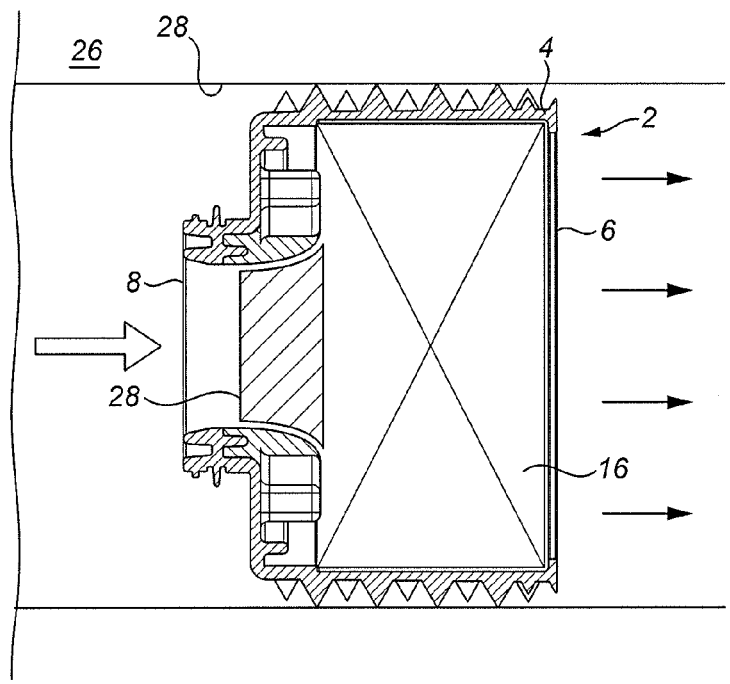
FIG. 4 is a view of the motor mount of the invention, similar to that in FIG. 2, but which shows the motor mount containing a motor and installed within a conduit, in use.

FIG. 2 illustrates the interior of the motor mount 2 without its motor and FIG. 4 shows a cross section through the motor mount 2 with an electric motor shown in situ. It will be appreciated that the electric motor 16 is shown schematically for simplicity and so as not to obfuscate the details of the motor mount 2. The motor is not central to the inventive concept and so will not be described in detail.

The purpose of the motor mount 2 is to fit around the motor and serve as an isolating interface between the external case of the motor 16 and an internal surface of an apparatus into which the motor is installed. To enhance the isolating characteristics of the motor mount 2, the sleeve 4 is provided with a noise attenuating means. In this embodiment, the noise attenuating means takes the form of a plurality of projecting elements or 'studs' 20 that are spaced around an outer surface 22 of the sleeve wall. Note that only two of the studs are labeled for clarity.

Figure 3:
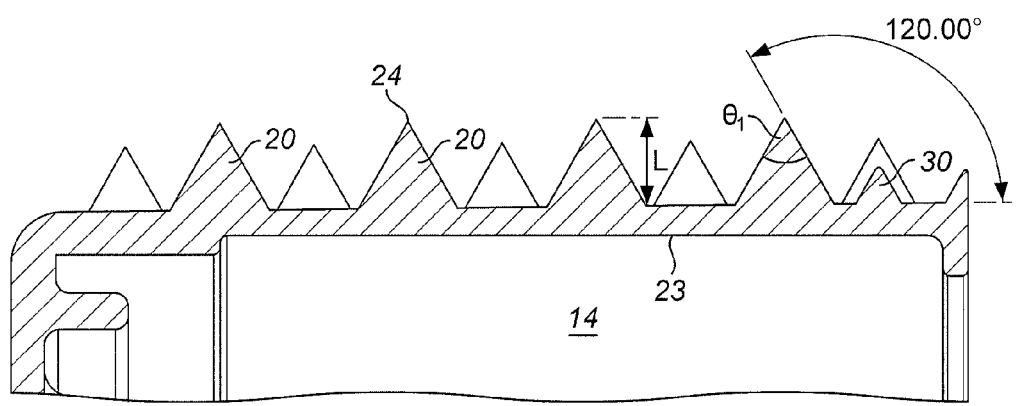
FIG. 3 is an enlarged view of a region of the motor mount in FIG. 2.

More specifically, the studs 20 are right circular cones, each of which defines a sharp point, also referred to as a vertex 24, as labeled in FIG. 3, that are directed away from the sleeve 4. The studs 20 therefore provide sharp points distributed radially about the surface of the sleeve 4 to serve as an interface with an adjacent housing into which the motor and motor mount is installed. FIG. 4 shows the motor mount 2 installed in a conduit or housing 26 and it will be seen that the studs 20 engage an inner surface 28 of the housing. The technical principle of the studs 20 is based on minimizing the area of contact that between the motor 16 and the housing 26 in order to reduce the transmission of energy from the motor 16 to the housing 26. However, at the same time, the studs 20 provide a secure mounting for the motor 16 therefore protecting it from shocks that may occur during use, for example, by a user dropping the device in which the motor is installed. To this end, there are numerous elements arranged radially about the outer surface 22 of the sleeve 4 in linear rows. In this specific embodiment, the number of elements in a row alternates between four elements and five elements. In total there are 126 elements in this embodiment, although the skilled person will appreciate that this figure is exemplary only. In selecting the number of elements for such a motor mount, a balance is to be struck between minimizing the number of elements in order to achieve a small area of contact between the mount and an adjacent housing, and providing sufficient elements to support the motor so that it is protected from shocks, in use.

In the specific embodiment shown particularly in FIG. 4, the electric motor 16 is equipped with an impeller 28 to act as a fluid mover, the air flow being depict by way of arrows. Such an arrangement may have particular application to devices which require high speed air flows, such as vacuum cleaners, hair dryers, and fans. However, it should be appreciated that the specific embodiment is only exemplary and that the motor mount is applicable to any apparatus in which a motor needs to be installed in a close conforming housing, whether or not the motor is coupled to an impeller.

FIG. 3 shows a region of the motor mount 2 in FIG. 2 in a larger scale so that details of the conical elements may be seen more clearly. In this embodiment, all of the elements are identical and have a height 'L' of 3 mm and a vertex angle θ of 60°. The selection of vertex angle is a compromise: if the vertex angle is too small (a relatively narrow cone) the cone tip 24 may flex when under load, and if the vertex angle is too large (relatively wide, shallow cone) the cone tip 24 may depress when under load.

Either of the two situations may result in a reduction of the beneficial noise isolation affect of the motor mount 2. Currently it is envisaged that a vertex angle between 40° and 80° is preferred, with 60° being most preferred although, in principle a suitable cone angle could be anywhere between 20° and 170° depending on the specific application in which the motor mount is to be used. For instance, a very shallow cone angle could be useful where a relatively large motor is used and only a limited space is available to fit the motor into its housing.

As has been mentioned above, it is preferred that the motor mount is a polymeric material. In this embodiment, polyurethane rubber is used. To optimize the noise reduction benefit of the motor mount 2, it is currently preferred that the material has a hardness of 40 Shore A. A hardness of this value has been found to offer surprisingly effective noise reduction, although materials with hardness between 30 and 60 Shore A are envisaged also to confer benefits.

The skilled person will appreciate that the hardness of plastics materials is commonly measured by the Shore Durometer test. This testing technique analyses the resilience of the material against an indenting tool. As is known in the art, Shore Hardness, using the Shore A or Shore D scales, is an established industry technique for expressing the hardness characteristic of material, particularly plastics. The Shore A scale is used for softer materials while the Shore D scale is used for harder materials.

In the embodiment shown in the Figures, the rearmost two rings of studs (as shown on the right hand side of the Figure) include ribs 30 that extend annularly around the sleeve 4 and form a bridge between adjacent studs 20 in a respective ring. The ribs 30 provide a strengthening structure for the sleeve 4 which increases the robustness of the sleeve 4 in the region local to the ribs 30. This provides increased protection for the motor 16 in that region in circumstances in which the motor is subject to high impact loads. Suitably, other formations like the ribs 30 may be provided on any area of the sleeve 4 in order to increase the rigidity of the sleeve 4 as necessary.

Some variations to the specific embodiment of the illustrative drawings have already been mentioned above. Others will now be explained below.

It should be noted that it is not essential for each and every stud 20 on the surface of the sleeve 4 to have a vertex, although it is currently preferred that each stud 20 defines a vertex. For example, the pointed studs may be combined with studs having rounded or squared off tops. Such rounded studs may provide further support to the motor during high impact loading. What is important is that the sleeve is provided with a plurality of sharply pointed studs that form the interface between the motor casing and the motor housing in order to reduce the acoustic energy transmitted from the motor casing to the surrounding housing through the motor mount.

The cylindrical shape of the sleeve is currently preferred since it functions to envelope the correspondingly shaped outer surface of the motor in an unbroken 'sock' of protecting and isolating material. However, it is also envisaged that benefits would be achieved if the sleeve were part cylindrical so that it does not envelope the entire outer surface of the motor.

Although the outer surface of the motor mount is provided with a plurality of pointed studs, in this embodiment, the inner surface of the motor mount is smooth. Reference to the smoothness of the internal surface of the sleeve is not intended as a precise value of surface roughness, rather that the inner surface should be substantially free from surface aberrations/bumps and projections, so that the inner surface makes uniform contact with the outer periphery of the external case of the motor. Without being bound by theory, it is believed that the smoothness of the inner surface of the sleeve promotes good acoustic contact between the motor and the sleeve.

In the illustrated embodiment, the studs take the form of right circular cones as it has been determined that such stud profiles provide a benefit in terms of noise attenuation, and particularly in reducing the high frequency tonal noise associated with the excitation frequencies of brushless DC and switched reluctance motors. However, stud profiles other than cones are also acceptable provided they terminate with a pointed end, or vertex.

For example, one alternative would be for the studs to be formed in the shape of a cone with a polygonal base, rather than a circular base as described in the specific embodiment. Expressed another way, the studs could be pyramidal instead of a circular cone. Another alternative would be for the studs to be prismatic in form, rather than conical, for example a triangular prism, so that a vertex is formed along a pointed ridge. Still alternatively, one or more of the studs may be bi-conic.

In the specific embodiment described above the sleeve is cylindrical. However, it should be appreciated that this is not essential to the invention and the sleeve may instead have a different cross sectional profile. Here, the profile is cylindrical so as to match the cylindrical profile of the motor casing since the sleeve should conform to its outer surface. It follows, therefore that the sleeve may have whatever profile is required to mate with an outer casing of a motor, although cylindrical motor casings are most common.

The invention claimed is:

1. A mount for an electric motor, the mount comprising a sleeve for receiving a motor, wherein the sleeve includes one or more ribs that annularly extend around the sleeve, the sleeve including plurality of elements projecting from a surface of the sleeve, wherein the one or more ribs form a bridge between one or more adjacent elements of the plurality of elements and provide a strengthening structure for the sleeve, wherein the plurality of elements include a vertex, wherein the vertex angle is between 20 and 170 degrees, the sleeve is formed of a polymeric material, the sleeve has a hardness of between 30 and 60 Shore A, and the motor is drivable at rotational speeds in the region of 100,000 rpm.

2. The mount of claim 1, wherein one or more of the plurality of elements are right circular cones.

3. The mount of claim 1, wherein the base of the cone is a polygon.

4. The mount of claim 1, wherein the vertex angle is between 40 and 80 degrees.

5. The mount of claim 1, wherein the vertex angle is 60 degrees.

6. The mount of claim 1, wherein the elements are provided solely on the radially outer surface of the sleeve.

7. The mount of claim 6, wherein a radially inner surface of the sleeve is smooth.

8. The mount of claim 1, wherein the sleeve has a hardness of 40 Shore A.

* * * * *